United States Patent
Swift et al.

(10) Patent No.: US 7,963,570 B2
(45) Date of Patent: Jun. 21, 2011

(54) QUICK CONNECT COUPLING STABILIZATION APPARATUS, SYSTEMS AND METHODS

(75) Inventors: Jonathan Clark Swift, Cambridge (GB); Paul Leggott, Northallerton (GB)

(73) Assignee: The Gates Corporation, Denver, CO (US)

( * ) Notice: Subject to any disclaimer, the term of this patent is extended or adjusted under 35 U.S.C. 154(b) by 972 days.

(21) Appl. No.: 11/580,406

(22) Filed: Oct. 13, 2006

(65) Prior Publication Data
US 2007/0145742 A1    Jun. 28, 2007

Related U.S. Application Data

(63) Continuation-in-part of application No. 11/217,751, filed on Sep. 1, 2005, now Pat. No. 7,445,250.

(51) Int. Cl.
*F16L 39/00* (2006.01)
(52) U.S. Cl. .......... 285/321; 285/39; 285/277; 285/307; 285/308; 285/314
(58) Field of Classification Search .............. 285/39, 285/276–277, 305, 307–309, 314–316, 321
See application file for complete search history.

(56) References Cited

U.S. PATENT DOCUMENTS

| | | | | |
|---|---|---|---|---|
| 2,092,243 A | * | 9/1937 | Breese | 277/625 |
| 2,436,206 A | * | 2/1948 | Deming | 137/614.03 |
| 2,568,516 A | * | 9/1951 | Scheiwer | 251/149.6 |
| 3,773,360 A | | 11/1973 | Timbers | 285/307 |
| 4,063,760 A | * | 12/1977 | Moreiras | 285/242 |
| 4,135,745 A | * | 1/1979 | Dehar | 285/319 |
| 4,217,101 A | * | 8/1980 | Loge | 433/126 |
| 4,278,276 A | * | 7/1981 | Ekman | 285/49 |

(Continued)

FOREIGN PATENT DOCUMENTS

DE    20 2005 005 319 U1    7/2005

(Continued)

OTHER PUBLICATIONS

Notification of Transmittal of the International Search Report and the Written Opinion of the International Searching Authority, or the Declaration for International Application No. PCT/US2007/021864 Mailed on Apr. 17, 2008.

*Primary Examiner* — Aaron Dunwoody
*Assistant Examiner* — Fannie Kee
(74) *Attorney, Agent, or Firm* — T. D. Dougherty, Esq.; J. A. Thurnau, Esq.; P. N. Dunlap, Esq.

(57) ABSTRACT

A quick to connect and quick to disconnect fluid coupling includes a clip, a male stem having an annular clip groove adapted to receive the clip, a female port having a step groove adapted to receive the clip upon insertion of the stem into the port, and a sleeve slideably disposed about the stem adapted to abut the clip and minimize shuttling of the stem within the port. The sleeve may be biased toward the clip by a dust seal abutting a shoulder of the sleeve distal from a lead-in end of the sleeve abutting the clip. Also, the sleeve may radially retain the clip, compressed in an annular groove of the stem, and/or the sleeve abutting the clip may stabilize the clip and axially align the clip with the stem, for insertion of the stem into the port.

12 Claims, 6 Drawing Sheets

U.S. PATENT DOCUMENTS

| | | | |
|---|---|---|---|
| 4,578,034 A * | 3/1986 | Shibata et al. | 433/29 |
| 4,645,245 A | 2/1987 | Cunningham | 285/321 |
| 4,750,765 A * | 6/1988 | Cassidy et al. | 285/321 |
| 4,872,710 A * | 10/1989 | Konecny et al. | 285/81 |
| 4,874,174 A * | 10/1989 | Kojima et al. | 285/82 |
| 4,949,745 A * | 8/1990 | McKeon | 137/15.09 |
| 5,553,895 A * | 9/1996 | Karl et al. | 285/39 |
| 5,570,910 A * | 11/1996 | Highlen | 285/308 |
| 6,186,557 B1 | 2/2001 | Funk | 285/39 |
| 6,319,001 B1 * | 11/2001 | Esrock | 433/80 |
| 6,450,545 B1 * | 9/2002 | LeMay et al. | 285/93 |
| 2002/0109351 A1 * | 8/2002 | Densel et al. | 285/39 |
| 2003/0052484 A1 * | 3/2003 | Rautureau | 285/305 |
| 2005/0161938 A1 | 7/2005 | Dahms | 285/39 |
| 2006/0061097 A1 | 3/2006 | Swift et al. | 285/321 |

FOREIGN PATENT DOCUMENTS

| | | |
|---|---|---|
| DE | 20 2005 000 750 U1 | 7/2006 |
| JP | 06185682 | 8/1994 |
| WO | WO 2006/033815 A1 | 3/2006 |

* cited by examiner

QUICK CONNECT COUPLING STABILIZATION APPARATUS, SYSTEMS AND METHODS

CROSS-REFERENCE TO RELATED APPLICATIONS

This is a continuation in part of U.S. patent application Ser. No. 11/217,751 filed Sep. 1, 2005 now U.S. Pat. No. 7,445,250, entitled Quick Connect Coupling, which is hereby incorporated herein by reference.

BACKGROUND OF THE INVENTION

1. Field of the Invention

This invention relates generally to flexible hose couplings. More particularly, it relates to quick connect hose couplings, and specifically to push-to-connect and quick to disconnect flexible hose couplings.

2. Description of the Prior Art

Quick connect couplings are known. In such couplings a port adapter may include the female portion or port and be pre-assembled on an associated fixture, machine or equipment or the female portion or port may be machined as part of associated fixtures, machinery or equipment. The hose connection or male portion or hose stem, including a hose insert portion and a ferrule, is typically attached to an open end of the hose to be connected to the fixture, machinery or equipment. The hose stem portion has a hose insert portion, which is inserted into the open end of the hose. A ferrule, or the like, is then typically compressed about the hose end containing the insert causing all portions to be permanently affixed. Merely pressing the hose connection portion into the female portion or port subsequently completes the hose connection. Such quick connect couplings are particularly desirable when the hose must be connected in a location which is not readily accessible since it eliminates the need for starting threads and the danger of cross threading and eliminates the need to use a related tool which might not fit in the available space. Since the port adapter may be threaded into place as a pre-assembly operation, or the port preexists in the associated fixture, machine or equipment, it is easy to insure that the port is proper and ready. Further, the time of assembly and, in turn, the assembly costs are reduced.

Historically, the considerations that have driven the design of such couplings have included complexity of port design, effecting machineability, complexity of stem design, complexity and location of sealing elements such as o-rings or other shape of seals, complexity and location of locking components such as clips of various shapes, total number of components needed to complete the coupling, and interplay of the geometry of the port and the stem. All of these have greatly affected the cost of producing such couplings which impacts greatly upon their economic viability.

It has also been important to ensure that such couplings can be used safely and reliably. Obviously, one of the primary purposes of such couplings is to provide a long lasting leak-free connection. However, over time, increasing emphasis has been placed upon safety. Typical quick disconnect characteristic of such couplings give rise to a greater opportunity for inadvertent and sudden disconnects, with grave results. This is particularly true in the environments where use of such couplings is especially appealing. These include industrial or heavy machinery locations where installations of fluid connections are numerous, dense, and almost inaccessible, having movement of many hard and heavy objects nearby, including the fixtures upon which the couplings are often attached. Unexpected impacts upon quick to disconnect couplings or maintenance in such difficult quarters can increase the likelihood of inadvertent disconnects. Inadvertent disconnects on pressurized systems can lead to damaged or broken machines, destroyed premises, severe injuries to maintenance or other workers, or even death, such as through unexpected machinery movement or spray of very hot fluids at high pressure.

One example of a push to connect and quick to disconnect coupling can be found in U.S. Pat. No. 3,773,360 to Timbers, which is incorporated herein by this reference. Timbers appears to be an attempt to provide both straight-forward push to connect and quick to disconnect processes while simplifying port and stem design to contain cost. Timbers discloses the advantage of a simple port design where no sealing or locking components or clips are integral. However, the disclosed stem is more complex including all sealing and locking components. Further, the locking component is intricate and relatively complex. Significantly, the disclosed coupling requires an additional component, or stop member, to make the coupling resistant to inadvertent disconnection. The complexity and additional components increases the cost of the coupling. The coupling of Timbers completes its fluid connection by simply pressing the male portion into the female portion. With the stop member removed, the coupling is disconnected by additional insertion of the male portion into the female portion into closer engagement. This causes the port to compress the locking component. The intricate shape of the locking component then allows it to grab onto the stem and stay compressed such that its locking function is deactivated. The two portions are then separated.

It was apparently contemplated that the coupling of Timbers would be inadvertently disconnected too easily to be safe in many environments. Accordingly, the stop member was included on the disclosed fitting. The stop member interferes with the male and female portions being pressed into closer engagement by filling space between the female and male portions. It would appear that the coupling with the stop member in place is resistant to inadvertent disconnection.

However, both the use and shape of the stop member leaves substantial opportunity for the coupling to experience disastrous inadvertent disconnection. First, there is no way to ensure that the stop member will be properly installed on the coupling during the entire time of its deployment. The stop member could be absent from the beginning or removed at any time during the life of the coupling leaving no tell-tale sign that anything is amiss. In such a condition the coupling would no longer be resistant to inadvertent disconnection. Second, the disclosed shape of the stop member includes a loop that extends radially away from the coupling. In the environments described above as those where the use of a quick to connect and quick to disconnect coupling is especially appealing, the loop would be subject to gathering debris or being hooked by moving objects. This gives rise to substantial opportunity for the stop member to be stripped from the coupling. Once again, the coupling would no longer be resistant to inadvertent disconnection.

Safety is also compromised by the existence of such a rigid loop in many industrial or heavy machinery environments. It can be a direct source of damage or injury through the entanglement of debris, tools, clothing, hair or fingers. Further, it is not inconsequential that every time the coupling is to be disconnected, the metal loop, comprising the stop member, is removed to become lost as hazardous debris.

Additional problems arise in solutions, such as Timbers and other prior art quick to connect and disconnect couplings employing a clip. There is the potential for the clip to reciprocate in its annular groove or the like. This reciprocation may occur along the centerline axis of the coupling or stem during operation in which impulsing pressure and/or lateral loading is present. This reciprocating motion or "shuttling" effect is not desirable as it may accelerate wear on the retention elements of the male and female fitting portions. This may consequently have an adverse effect on the potential life of the connection. This shuttling effect may become more apparent and significant on larger bore couplings in which the clip cross-sectional thickness and consequently its annular groove width is greater, allowing more room for the shuttling to occur.

SUMMARY

The present invention is directed to systems and methods which stabilize a quick to connect and quick to disconnect coupling, minimizing axial shuttling of the stem within the port under pressure variation and impulse while having greatly enhanced safety by being highly resistant to inadvertent disconnection. The resistance to inadvertent disconnection preferably does not rely on human intervention to ensure all safety components are present upon the coupling.

An example of a coupling that exhibits greatly enhanced safety by being highly resistant to inadvertent disconnection can be seen in the Gates QuickLoc™ Direct couplings. Such coupling embodiments provide a quick connect and quick to disconnect hose coupling with an improvement in safety while retaining economical production and the benefits of such quick connect/disconnect couplings. Such couplings may employ a clip, a male portion having an annular groove adapted to receive the clip, a female portion, and a sealing element. Ports of such couplings may also have a dual function frustoconical portion, or the like, adapted to compress the sealing element during joinder of the male portion with the female portion as well as to compress the clip into the annular groove in preparation of separating the male portion from the female portion. Embodiments of these couplings may employ a sleeve slideably placed about the male portion and adapted to capture the clip compressed within the annular groove. However, such designs employing a clip and an annular groove or the like, might have a potential for shuttling, as discussed above.

An object of the present invention is to provide quick connect and quick to disconnect hose couplings with an improvement in coupling stability while retaining economical production and the benefits of such couplings.

The present invention is a quick to connect and quick to disconnect fluid coupling of the type having a clip, a male portion having an annular groove adapted to receive the clip, a female portion, and a sealing element. The male portion has a conical groove where the dust seal resides. The groove is located on the male portion such that the dust seal seals an exterior end of the slideable sleeve. The groove and dust seal react in a manner such that when installed the sleeve is pushed axially forward towards the clip and step groove. The forward loading of the sleeve in turn takes up clearance in the retaining groove, or step, portion of the stem, this in turn limits and dampens the free motion of the stem relative to the port once the coupling is connected. Furthermore, this forward preloading of the stem, clip and sleeve within the port aligns the male and female portions of the coupling and provides resistance to radial movement of the stem relative to the port when a side load is introduced to the coupling.

Embodiments of an apparatus in accordance with the present invention are adapted to be deployed in conjunction with a quick to connect and quick to disconnect fluid coupling. A quick to connect and quick to disconnect fluid coupling system employing the present apparatus may include a clip, a male stem having an annular clip groove adapted to receive the clip and a female port having a step groove adapted to receive the clip upon insertion of the stem into the port. When the coupling is joined, various apparatus embodiments preferably abut the clip disposed about the stem and in the groove defined by the port portion of the coupling, thereby retaining the clip against a wall of the groove defined by the port. Preferably the apparatus abutting the clip prevents shuttling of the stem within the port. Particularly, the apparatus abutting the clip may minimize shuttling of the stem within the port under pressure variations, impulsing and physical manipulation of the stem (such as may occur due to hose movement). The apparatus may be biased toward the clip, axially retaining the stem relative to the groove defined by the port.

The apparatus may take the form of a sleeve slideably disposed about the stem portion of the coupling. Additionally, the apparatus might employ a dust seal groove defined in the stem, spaced apart from clip and a dust seal disposed in the seal groove. The dust seal may abut a shoulder of the sleeve that is distal from a lead-in end of the sleeve that abuts the clip. In accordance with embodiments of the present invention, the sleeve abutting the dust seal biases the sleeve toward the clip, thereby biasing the abutting of the sleeve against the clip.

To facilitate joinder of the coupling, the apparatus or sleeve may also be adapted to radially retain or capture the clip, compressed in an annular groove of the stem, for insertion of the stem into the port. Additionally or alternatively, the apparatus or sleeve may be adapted to abut the clip, prior to insertion of the stem into the port, to stabilize the clip and axially align the clip with the stem for insertion of the stem into the port. This axial alignment of the clip with the stem may seat the clip on a retaining step defined by the stem. During insertion of the stem into the port a clip axially aligned by the apparatus may abut a port lead-in angle and the port lead-in angle may compress the clip axially into an annular stem retaining groove, enabling the stem to be installed in the port without the clip being fully retained under an apparatus sleeve.

To facilitate disconnection of the coupling the apparatus may be adapted to radially retain the clip compressed in an annular groove of the stem. For example, the apparatus may be adapted to radially retain the clip compressed in the annular groove when the stem is further inserted into the port in preparation of separating the stem from the port. More particularly, the port may further comprise a frustoconical ramp adapted to compress the clip into an annular clip groove of the stem when the stem is further inserted into the port in preparation of separating the stem from the port and a sleeve comprising the apparatus may be adapted to radially retain the clip compressed in the annular groove for removal of the stem from the port.

Thus, in accordance with embodiments of the present invention a method for preventing shuttling of a stem within the port of a joined coupling may comprise the steps of slideably disposing a sleeve about a stem portion of a coupling, abutting a clip disposed about the stem with a lead-in end of the sleeve, and retaining the clip against a wall of a groove defined by a port portion of the coupling to prevent shuttling of the stem within the port under pressure variations, impulsing, physical manipulation of the stem, and the like. Additionally, this method might employ a dust seal groove defined in the stem, spaced apart from clip, a dust seal disposed in the dust seal groove, and a shoulder of the sleeve, distal from the lead-in end, abutted against the dust seal, thereby biasing the sleeve toward the clip and biasing the abutting of the sleeve against the clip.

In accordance with embodiments of such methods, the sleeve thus slideably disposed about a stem portion of a coupling may be used to radially retain a clip disposed about the stem portion, with the clip compressed into an annular groove of the stem portion, to facilitate inserting the stem portion into a port portion of the coupling. During such insertion a lead-in end of the sleeve may abut against a frustoconical ramp defined by the port portion, thereby arresting movement of the sleeve into the port and radially releasing the clip. Subsequently, the lead-in end of the sleeve may abut against the clip, as discussed above, to retain the clip against a wall of a groove defined by a port portion of the coupling to prevent shuttling of the stem within the port.

Method embodiments also may alternatively facilitate installation of the stem in the port, without capturing the clip, by abutting a lead-in end of said sleeve against the clip disposed about the stem and disposed in an annular groove of the stem, stabilizing the clip and axially aligning the clip with the stem for inserting the stem into the port. Axially aligning the clip with the stem might seat the clip on a stem retaining step and when inserting the stem in the port further the clip may be abutted with a port lead-in angle. The port lead-in angle compresses the clip axially into the stem's annular retaining groove, in accordance with such embodiments, enabling the stem to be installed in the port without the clip being fully retained under the sleeve.

In accordance with method embodiments the clip may be radially retained with the sleeve to compress the clip in an annular groove of the stem for removing the stem from the port. To this end a frustoconical ramp such as discussed above may be defined by the port such that further inserting the stem into the port compresses the clip into an annular clip groove defined by the stem, such that the clip may be radially retained using the sleeve to compress the clip into the annular groove for removing the stem from the port.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

Referring to FIG. 1, embodiment 100 of the present invention is shown deployed in conjunction with, or as a part of, quick connect coupling 101. Coupling 101 includes female portion or port 110 and hose stem, or male portion, 112. Sleeve 102 is mounted upon and in slideable relation to stem 112. Sleeve 102 has capture cylinder 104 and shoulder 106. When coupling 101 is coupled, sleeve capture cylinder 104 preferably secures stem 112 from shuttling in port 110, as described in greater detail below. Additionally, sleeve 102 is preferably used to connect and disconnect coupling 101, as also discussed in greater detail below.

DETAILED DESCRIPTION

Figure 1:
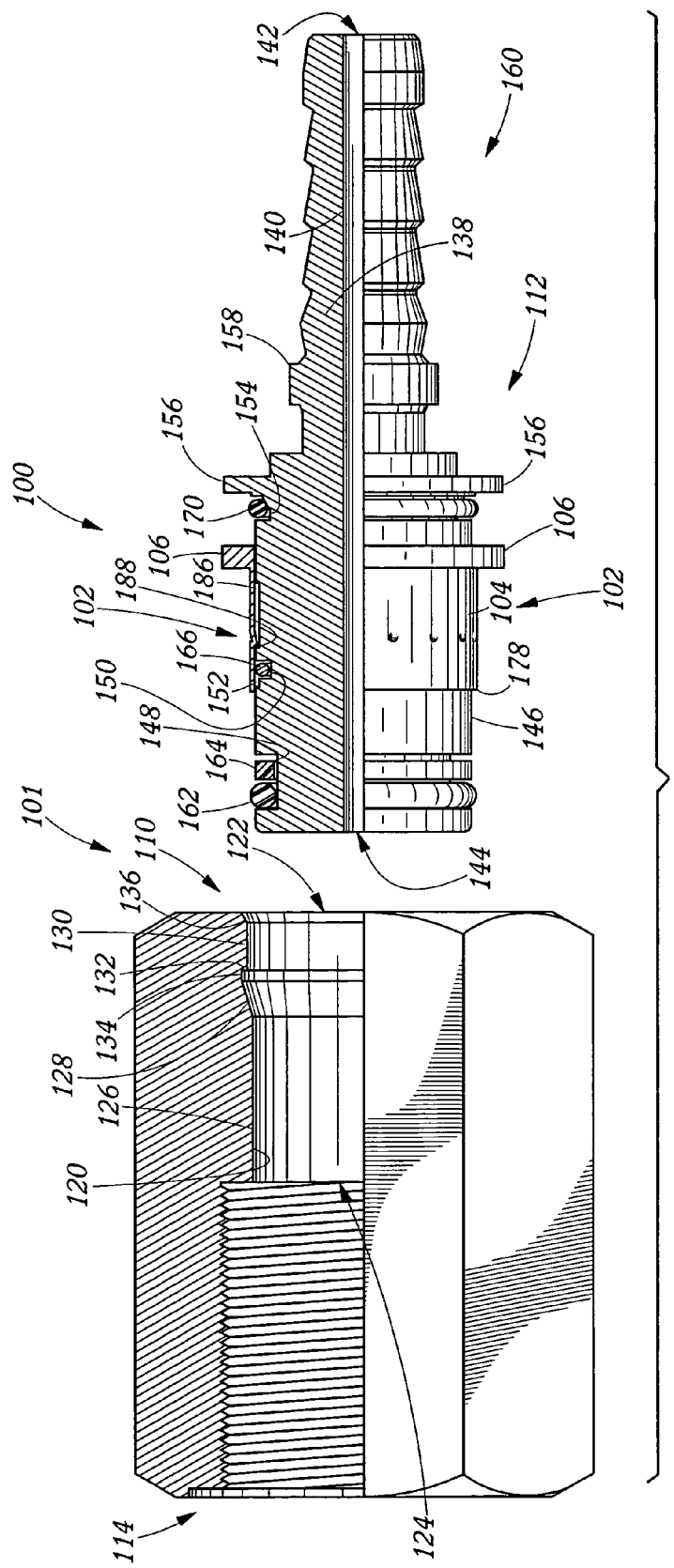
FIG. 1 is a partially fragmented, generally one quarter cut-away, view of a decoupled (or disconnected) quick connect coupling employing an embodiment of the present invention.

Referring to FIG. 1, embodiment 100 of the present invention is shown deployed in conjunction with, or as a part of, quick connect coupling 101. Coupling 101 includes female portion or port 110 and hose stem, or male portion, 112. Sleeve 102 is mounted upon and in slideable relation to stem 112. Sleeve 102 has capture cylinder 104 and shoulder 106. When coupling 101 is coupled, sleeve capture cylinder 104 preferably secures stem 112 from shuttling in port 110, as described in greater detail below. Additionally, sleeve 102 is preferably used to connect and disconnect coupling 101, as also discussed in greater detail below.

The example female portion or port 110 is illustrated as part of an adapter 114, as one contemplated embodiment and for convenience of illustration. Alternately, and possibly preferably, port 110 may be machined into the body of a fixture, machine or equipment (not depicted). For those instances where port 110 is formed into an adapter 114, as illustrated, adapter 114 provides the base for port 110. For those instances where port 110 is formed into a fixture, machine or equipment, these provide the base. Port 110 has an interior surface 120 defining an inlet opening 122, an outlet opening 124, a fluid passage 126, a first frustoconical ramp 128, a first cylinder 130, annular wall 132, second frustoconical ramp 136, and optionally second cylinder 134. In the illustrated example, first frustoconical ramp 128 is a dual function ramp serving functions in both the connection and disconnection operations, to be described later. Second frustoconical ramp 136 is a lead-in ramp providing a port lead-in angle, which may be significant to connection operation in the example fitting, as also described later.

Still referring to FIG. 1, exemplar hose stem 112 includes shaft 138 with a bore 140 having a stem inlet opening 142 and a stem outlet opening 144. The shaft has an exterior surface 146 defining a first annular seal groove 148, an annular clip groove 150, an annular retaining step groove 152, a second annular seal groove (dust seal groove 154), flange or debris barrier 156, hose stop 158, hose insert 160, and annular sleeve retaining groove 186.

Hose insert 160 may be placed in an opened end of a hose (not depicted) that would carry a subject fluid. Insertion would normally progress until the end of the hose met the hose stop 158. The hose would be affixed in common manner with a clamp or ferrule (not depicted).

First annular seal groove 148 carries first seal 162 and seal backing or anti-extrusion ring 164. First seal 162 may be a sealing element in the form of an o-ring or the like. Anti-extrusion ring 164 preferably serves to increase the pressure at which the coupling can operate without fluid leaking past first seal 162. Other available seal designs are also contemplated and compatible with the present invention, as are other coupling configurations.

Figure 7:
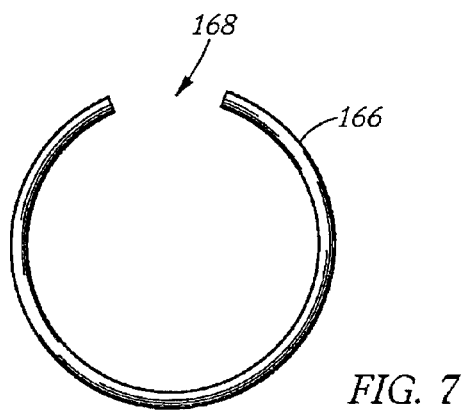
FIG. 7 is a plan view of a locking element in the form of a snap-ring.

Clip 166 is a locking element that may take the form of a snap-ring, trapezoid, or the like, which may have a gap, such as gap 168, depicted in FIG. 7. Other clip shapes, such as with a square as opposed to a round cross section, are also contemplated. Clip 166 is sized small enough that gap 168 must be enlarged to allow clip 166 to be large enough to pass over external stem surface 146. However, clip 166 is also preferably sized such that gap 168 can be reduced to allow clip 166 to be reduced in diameter sufficiently to pass through first cylinder 130 of port 110. Preferably clip 166 is thick enough that it fills a substantial portion of the void created by first ramp 128 and optionally by second cylinder 134 of port 110. When so sized, clip 166 additionally acts as a wear buffer prolonging the life of coupling 101 by minimizing the wearing of port 110, particularly when deployed in conjunction with the present invention, as discussed more fully below. Gap 168 is preferably large enough to allow adequate reduction of clip 166 within clip groove 150. Clip 166 can be initially carried loosely in clip groove 150 of stem 112 when stem 112 is not coupled with port 110.

Second annular seal groove, dust seal groove 154, of stem 112 preferably carries a second seal, such as dust seal 170. Sleeve 102 is mounted upon exterior surface 146 of stem 112 in slideable relation to stem 112. As mentioned above, sleeve 102 has capture cylinder 104 and shoulder 106. When sleeve 102 is moved against dust seal 170, such as by sleeve shoulder 106 abutting dust seal 170, sleeve 102 is held partially over clip groove 150 with clip 166 butted against lead-in end 178 of sleeve 102 (see FIG. 2) held firmly ready for initial preparation for installation. Dust seal groove 154 may incorporate a ramped surface providing geometry allowing movement of dust seal 170 by sleeve 102. Such a ramped surface utilizes inherent resilient tension provided by the dust seal o-ring to resist excessive motion of sleeve 102. Alternatively, when sleeve 102 is moved forward, toward stem outlet 144, as depicted in FIG. 1, clip 166 is captured by sleeve cylinder 104 within clip groove 150. Preferably, an uncoupled stem's clip is retained in this manner during shipment and prior to insertion into a port.

Figure 3:
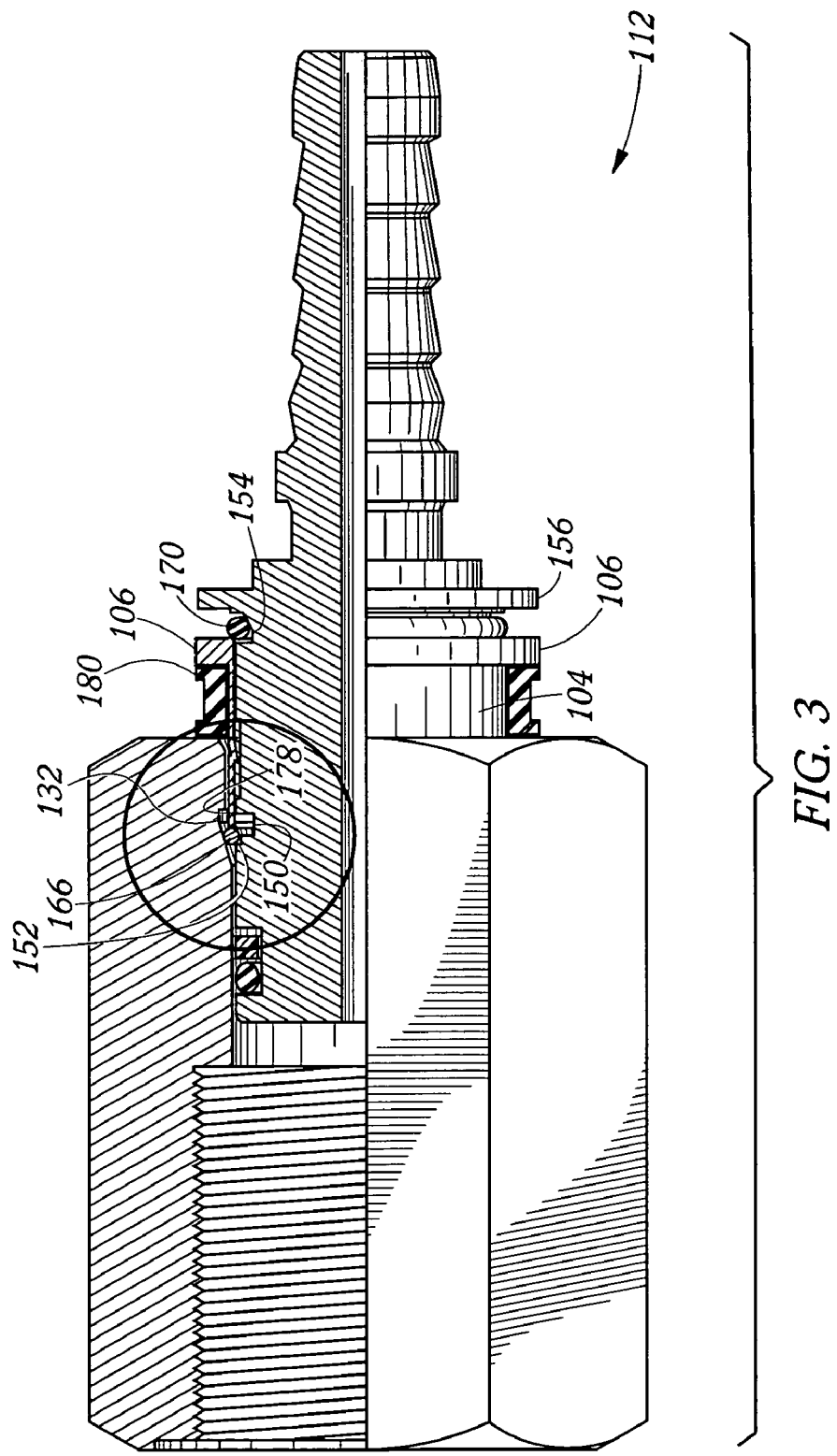
FIG. 3 is a partially fragmented, generally one quarter cut-away, view of a coupled quick connect coupling employing an embodiment of the present invention for stabilization.

Dust seal 170 both seals the interface between exterior surface 146 and sleeve 102 against movement of contaminants, and provides friction to dampen movement of sleeve 102. As shown in FIG. 3, third seal 180 may be placed about capture cylinder 104 to span the gap between shoulder 106 and port 110 when coupling when coupling 101 is connected. Third seal 180 seals the interface of capture cylinder 104 and second ramp 136 against contaminants and/or the like.

Capture cylinder 104 may include one or more press spots 188 which are the result of a crimping or pressing operation, and function as restraining detents. It is also contemplated that these restraining detents could be formed by machining or molding similar shapes into capture cylinder 104. Press spots 188 are diminutive to allow sleeve 102 to be slid into place upon exterior surface 146. Once so placed, the interaction of retaining groove 186 and press spot 188 restricts sleeve 102 from being removed from exterior surface 146.

Figure 2:
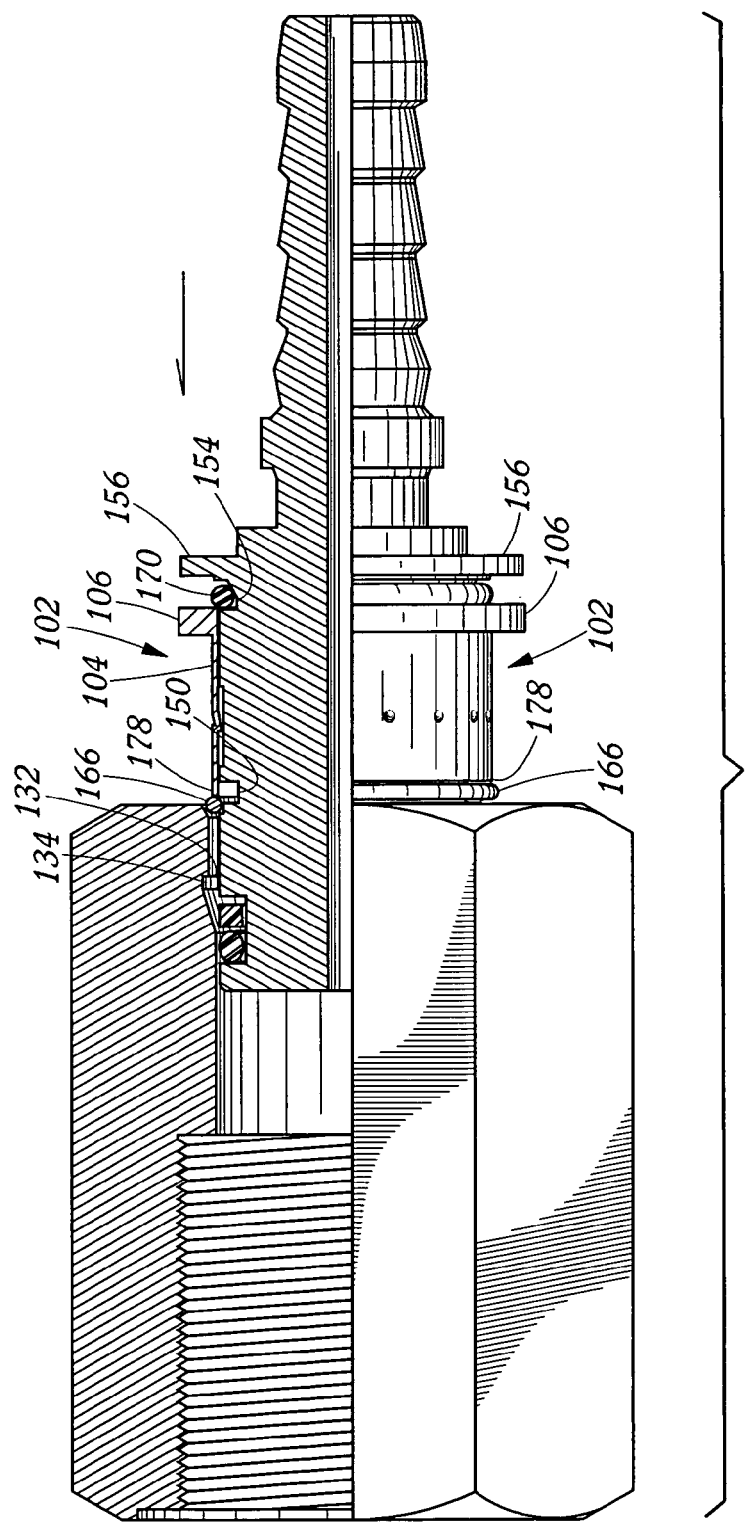
FIG. 2 is a partially fragmented, generally one quarter cut-away, view of a quick connect coupling employing an embodiment of the present invention, shown during coupling operation (insertion)
Figure 4:
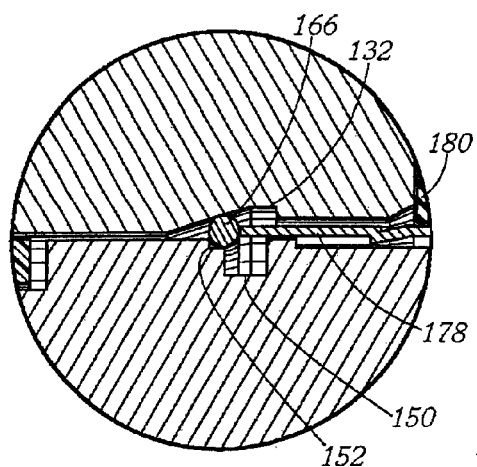
FIG. 4 is an exploded detail, from the circled portion of FIG. 3.

Connection of coupling 101 is effected by inserting stem 112 into port 110, as depicted in a beginning phase, with regard to the relationship of stem 112 to port 110, in FIG. 2. In accordance with embodiments of the present invention clip 166 is captured by sleeve 102 in preparation for insertion of stem 112 in port 110, as depicted in FIG. 1. Insertion of stem 112 may continue, through the position depicted in FIG. 2 (with or without sleeve 102 extending over clip 166), to the position depicted in FIG. 3, and detailed in FIG. 4. During insertion, first seal 162 is preferably guided by second ramp 136 into alignment with first cylinder 130. First seal 162 is then compressed by first ramp 128 so that first seal 162 can move into a satisfactory sealing position between stem 112 and fluid passage 126. Because of this sealing relationship, fluid passage 126 can also be referred to as a sealing bore. Sleeve 102 is also preferably guided by second ramp 136 into alignment with first cylinder 130. As insertion progresses, sleeve lead-in 178 abuts first ramp 128. After abutment of sleeve lead-in 178 and first ramp 128, insertion of shaft 138 of stem 112 continues even though insertion of sleeve 102 is preferably halted by this abutment. This results in sleeve 102 moving toward dust seal 170, sleeve 102 releasing clip 66, and sleeve shoulder 106 preferably pressing dust seal 170 up annular dust seal groove 154. At this point, clip 166 is preferably captured by passage 126. Stem 112 then retracts, or is retracted, to the point depicted in FIG. 3, where clip 166 expands into the void left by first ramp 128 and second cylinder 134. Stem 112 and port 110 are now in axial locking relationship. If a force is applied to stem 112 to expel or pull it from port 110, such as under the influences of fluid pressure or pulling upon stem 112 ("non-allowed separation"), clip 166 will be pressed into step groove 152 by wall 132. Clip 166 will then be jammed between step groove 152 and wall 132. Retraction of stem 112 from port 110 will not be allowed.

It is contemplated that insertion could be accomplished from a beginning point with sleeve 102 abutting dust seal 170, and sleeve lead-in 178 in turn abutting clip 166 (FIG. 2). In this configuration clip 166 is not captured by sleeve 102 prior to connection. In this instance, insertion forces would include not only the force necessary to compress first seal 162 by second ramp 136, and by first ramp 128 in sequence, but the additional force necessary to compress clip 166 by second ramp 136. The force required to compress clip 166 by second ramp 136 might be substantial, particularly in contrast, to utilizing the above-described configuration (initially illustrated in FIG. 1) where clip 166 is captured by sleeve 102. Still, in accordance with the present invention, the position of dust seal 170, abutted against the sleeve shoulder 106 of sleeve 102 biases the sleeve into contact with clip 166 and thereby facilitates connection. When deployed as shown in FIG. 2 sleeve lead-in 178 abuts clip 166, holding clip 166 in a more stable, axially aligned, position prior to insertion. When insertion begins using this configuration clip 166 is forced down second ramp 136 and at the same time sleeve 102 is forced back against dust seal 170, which in turn compresses dust seal 170 and forces dust seal 170 up annular dust seal groove 154, biasing sleeve 102 toward clip 166. This interaction between dust seal 170, dust seal groove 154, sleeve 102 and clip 166 ensures that alignment of clip 166 is maintained during the insertion and compression phase until the clip reaches first cylinder 130 and before locking into wall 132.

Repeated attempts for non-allowed separation of coupling 101 while in the axial locking relationship, would typically wear upon wall 132, and clip groove 150. However, the sizing of clip 166 described earlier and the presence of step groove 152 assist to prevent wear, but dust seal 170 pushing against shoulder 106 of sleeve 102 causing sleeve lead-in 178 to abut against clip 166, preloading the coupling (FIG. 3) greatly reduces such wear. Selecting a clip sized large enough to fit snugly in the void left by first ramp 128 and second cylinder 134, causes the clip to provide the additional function of a protective insert. A smaller sized clip would work against wall 132 under the influences of non-allowed separation, wearing the material from which port 110 is formed, which is commonly softer than the material from which a clip is formed. The addition of step groove 152 causes wear to occur in an orderly manner that gives indication of such wear. For example stem 112 seating in a less inserted manner in port 110, causes leakage through first conical ramp 128 when in axial locking relationship, without a connection failure of coupling 101. Furthermore, in accordance with the present invention abutment of sleeve lead-in 178 against clip 166, as shown in FIG. 3 and detailed in FIG. 4, inhibits axial movement of stem 112 within port 110 about the clip groove 150 and thereby prevents shuttling of stem 112 within port 110 under an alternating load when stem 112 and port 110 are connected. Inhibiting this shuttling movement further reduces the potential for wear on step groove 152. Furthermore, capture cylinder 104 of sleeve 102 at least partially fills the space between external surface 146 and first cylinder 130, further stabilizing stem 112 against lateral movement in relation to port 110. Accordingly, first cylinder 130 becomes a stabilizing bore in accordance with embodiments of the present invention.

Figure 6:
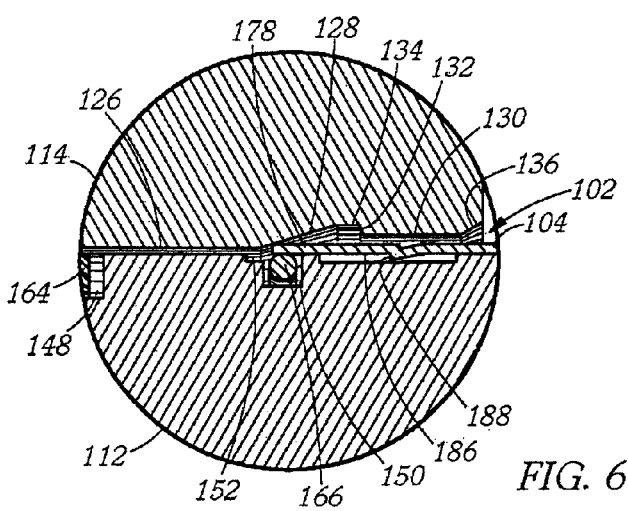
FIG. 6 is an exploded detail, from the circled portion of FIG. 5.
Figure 5:
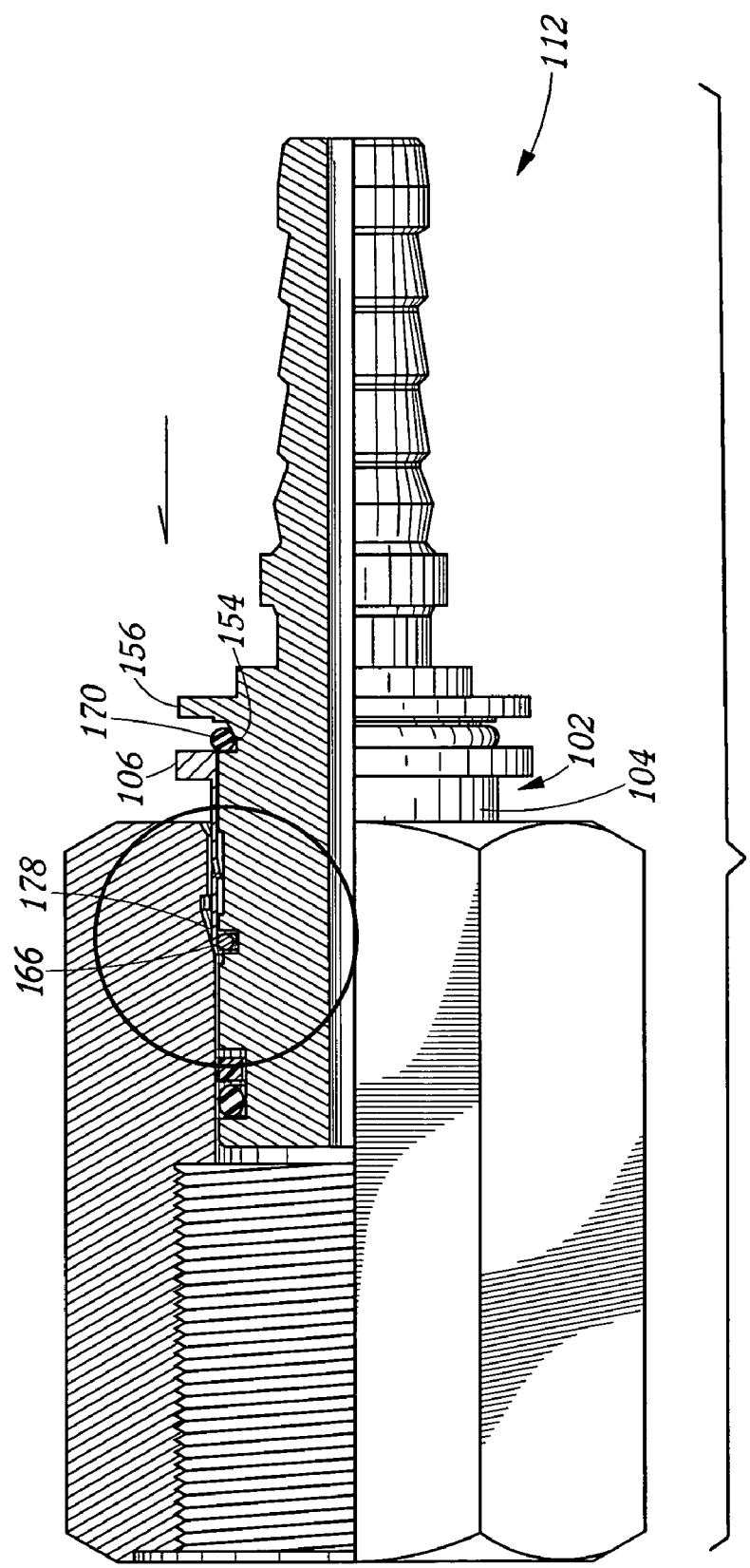
FIG. 5 is a partially fragmented, generally one quarter cut-away, view of a quick connect coupling employing an embodiment of the present invention showing further insertion of the fitting preparatory to decoupling or disconnection.
Figure 8:
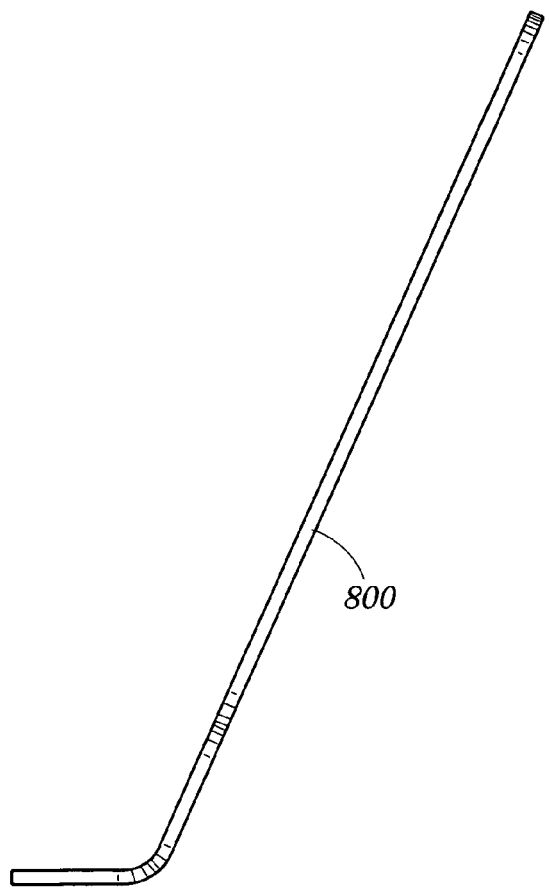
FIG. 8 is an elevation of a disconnect tool.
Figure 9:
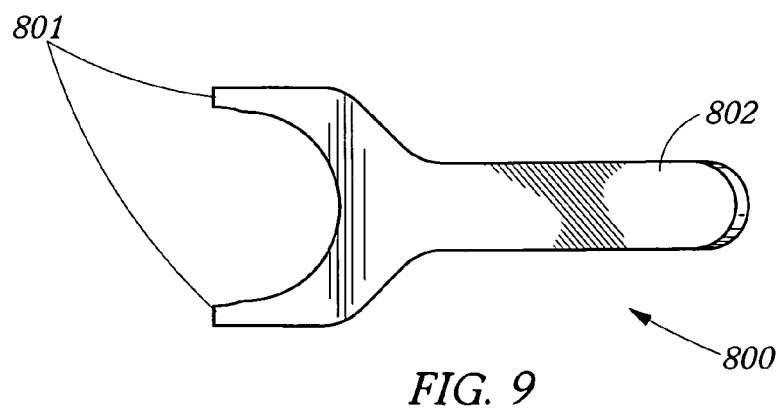
FIG. 9 is a plan view of the disconnect tool of FIG. 8.

Preferably, disconnection of coupling 100 is effected by first increasing the insertion of stem 112 into port 110 as depicted by the arrow in FIG. 5. FIGS. 5 and 6 depict an intermediate position. In this first disconnection step, first ramp 128 displaces clip 166 from step groove 152 toward clip groove 150 and then compresses clip 166 into clip groove 150. During this first step of disconnection first ramp 128 can be regarded as a disconnection ramp. Insertion continues until sleeve lead-in 178 abuts first ramp 128, and clip 166 is compressed to a size that fits within passage 126. Sleeve 102 is then axially moved to the position depicted in FIG. 1, in relation to stem 112, to capture clip 166. This may be affected, not by moving sleeve 102 in the direction of the arrow, but rather by holding it steady while shaft 138 is retracted opposite of the direction indicted by the arrow in FIG. 5. In practice, this may be accomplished by applying a wedging action between shoulder 106 and flange 156. A tool (not shown), such as a blade screwdriver, can provide the wedging action by inserting the screwdriver's blade between shoulder 106 and flange 156 and twisting. Special purpose tool 800 depicted in FIGS. 8 and 9 can also provide the wedging action. Tines 801 are inserted between flange 156 and shoulder 106. Special purpose tool 800 is then rocked by applying pressure to handle 802 to provide the wedging action. Once clip 166 is thus captured under sleeve 102, the jamming of clip 166 between wall 132 and step groove 152, discussed above, cannot occur. The stem 112 becomes free to be disconnected from port 110 and stem 112 may be retracted from port 110.

There are several subtle aspects to the instant invention that make it essentially fail safe against inadvertent disconnection. Primarily, disconnection requires a combination of actions that will not occur naturally. Merely pushing upon stem 112 has no effect upon causing disconnection. Even pushing upon both stem 112 and shoulder 106 will not lead to disconnection. Disconnection requires the concerted efforts of pushing stem 112 into port 110 and wedging shoulder 106 apart from flange 156. Further, urging capture sleeve 102 toward the clip capture position without first increasing the insertion of stem 112 into port 110 is completely ineffective for two complementary reasons. One, sleeve lead-in 178 preferably tends to abut clip 166, or move clip 166 farther out of clip groove 150 as well as back toward step groove 152. Two, step groove 152 is preferably too shallow to allow clip 166 to be compressed to a size that fits within passage 126. Preferably, sleeve shoulder 106 does not extend beyond the outside diameter of flange 156. Accordingly, sleeve 102 preferably does not lend itself to being simply gripped and pushed into this clip capture position. These subtleties further provide a quick to connect and quick to disconnect coupling that is relatively much safer than other quick to connect and quick to disconnect couplings, while also being stabilized to minimizing axial shuttling of the stem within the port under pressure variation, impulse, and/or the like, axially aligning the clip with the stem, or capturing the clip, for insertion of the stem into the port, and retaining other desirable features.

Although the present invention and its advantages have been described in detail, it should be understood that various changes, substitutions and alterations can be made herein without departing from the spirit and scope of the invention as defined by the appended claims. For example, the present invention, may be employed with other coupling designs. Particularly sleeve 102 may be mounted upon and in slideable relation to the stem of a coupling of another configuration and dust seal 170 and annular dust seal groove 154 may be employed with sleeve 102 on such a stem to obtain similar results as described above to prevent shuttling and or aid in disconnection. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A quick to connect and quick to disconnect fluid coupling system comprising:
  a clip;
  a male stem having an annular clip groove adapted to receive said clip;
  a female port having a frustoconical ramp defined void adapted to receive said clip upon insertion of said stem into said port; and,
  a sleeve slideably disposed about said stem adapted to abut said clip and retain said clip in said frustoconical ramp defined void,
  wherein said stem further comprises a dust seal groove, spaced apart from said annular clip groove, said dust seal groove receiving a dust seal, said dust seal abutting a shoulder of said sleeve distal from a lead-in end of said sleeve abutting said clip.

2. The coupling system of claim 1, wherein said sleeve abutting said clip prevents shuttling of said stem within said port.

3. The coupling of claim 1, wherein said sleeve abutting said clip minimizes shuttling of said stem within said port under pressure variations, impulsing and physical manipulation of said stem.

4. The coupling system of claim 1, wherein said dust seal groove comprises a ramped surface that allows movement of said dust seal and said ramped surface utilizes resilient tension provided by said dust seal to resist excessive motion of said sleeve.

5. The coupling system of claim 4, wherein said shoulder of said sleeve abutting said dust seal biases said sleeve toward said clip thereby biasing said abutting of said sleeve against said clip.

6. The coupling system of claim 5, wherein said biasing said abutting of said sleeve against said clip axially retains the stem relative to the port frustoconical ramp defined void, thereby preventing shuttling of said stem within said port.

7. The coupling system of claim 1, wherein said sleeve is adapted to radially retain said clip compressed in said annular clip groove for insertion of said stem into said port.

8. The coupling system of claim 1, wherein said sleeve retains said clip in said groove by retaining said clip against a wall of said annular clip groove.

9. The coupling system of claim 1, wherein said sleeve is adapted to abut said clip, stabilizing said clip and axially aligning said clip with said stem for insertion of said stem into said port.

10. The coupling system of claim 9, wherein said axially aligning said clip with said stem seats said clip on a stem retaining step, and said clip abuts a port lead-in angle upon insertion of said stem into said port, said port lead-in angle compressing said clip axially into the stem's annular clip groove enabling said stem to be installed in said port without said clip being fully retained under said sleeve.

11. The coupling system of claim 1, wherein said sleeve is adapted to radially retain said clip compressed in said annular clip groove for removal of said stem from said port.

12. The coupling system of claim 1, wherein said frustoconical ramp is adapted to compress said clip into said annular clip groove when said stem is further inserted into said port in preparation of separating said stem from said port and said sleeve is adapted to radially retain said clip compressed in said annular clip groove for removal of said stem from said port.

* * * * *